United States Patent Office 2,752,344
Patented June 26, 1956

2,752,344
PIPERAZINE GLYCOLYLARSANILATE

Geza S. Delmar, Baie d'Urfe, Quebec, and Ernest Neil Macallum, Lachine, Quebec, Canada, assignors to Delmar Chemicals Limited, Lachine, Quebec, Canada, a corporation of Canada No Drawing. Application July 23, 1954, Serial No. 445,478

3 Claims. (Cl. 260—242)

The present invention relates to new piperazine acid addition salts.

Piperazine has been recommended for the treatment of threadworms (British Medical Journal, October 3, 1953, page 755). For this treatment piperazine is being used in the form of various salts, for example, the citrate, the diphenyl acetate and the adipate. There are indications that of these salts the adipate may have an advantage in the fact that it has a relatively low solubility in water and consequently shows less undesirable side reactions (toxic effects) than more soluble piperazine salts or piperazine itself (British Medical Journal, February 27, 1954, page 521).

In all the above salts, the active component is only piperazine while the acids heretofore used (citric acid, diphenylacetic acid and adipic acid) have no therapeutic activity in themselves.

It has, therefore, been found desirable to prepare an acid addition salt of piperazine wherein the salt itself is substantially water-insoluble to avoid the usual toxic side reactions which occur with the water-soluble piperazine salts of piperazine itself and wherein the acid component has a desirable therapeutic activity.

In accordance with the present invention, it has been found that the acid addition salts of piperazine di-glycolylarsanilate and piperazine glycolylarsanilate hydrochloride are substantially water-insoluble and are more active for the treatment of threadworms than piperazine alone or any salts of piperazine which has been used heretofore.

The new piperazine acid addition salts of the present invention are obtained either by reacting piperazine with glycolylarsanilic acid or by reacting piperazine with glycolylarsanilic acid and hydrochloric acid.

It has been found that when piperazine is reacted with glycolylarsanilic acid, only one stable salt can be formed. This is surprising in view of the fact that piperazine is a divalent base and glycolylarsanilic acid is a divalent acid. Theoretically it should be possible to form a salt with one mol glycolylarsanilic acid and one mol piperazine or with one mol of glycolylarsanilic acid and two mols of piperazine or 2 mols of glycolylarsanilic acid and one mol of piperazine. Of the above three salts, one would be expected to be acidic in character, one basic in character and one would be neutral. However, when all three salts were prepared it was found that two of them are unstable and one or the other of the components, that is, either glycolylarsanilic acid or piperazine can be removed from the salts with relative ease, for instance, by extracting the formed salt with water. Only one of the three salts proved to be stable and only one can be considered as a real salt in the chemical sense of the word. This salt is the piperazine di-glycolylarsanilate with the following formula:

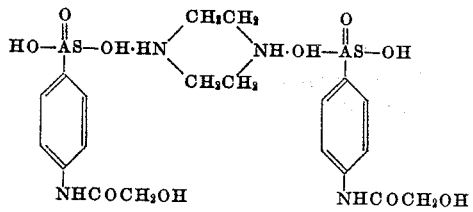

It has also been found that if piperazine is reacted with glycolylarsanilic acid and hydrochloric acid, there is obtained the mixed salt having the formula:

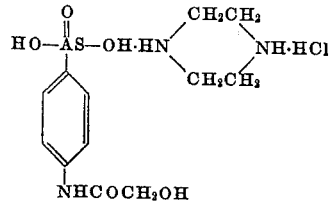

This salt is also water-insoluble which makes it particularly useful for the treatment of threadworms.

Example I 55 grams of glycolylarsanilic acid were stirred in hot alcohol with 19.4 grams of piperazine hexahydrate. The mixture was cooled to 20° C., filtered and the precipitate was washed with alcohol.

The above compound has no definite melting point but decomposes at very high temperatures. It is soluble to a slight extent in hot water and is practically insoluble in cold water. It is insoluble in most organic solvents.

In view of its substantial insolubility in water, this product was found to be highly useful and more effective than piperazine alone or its water-soluble salts in the treatment of threadworms and is preferably used in a proportion of about 100 mgm./15 lbs. body weight.

Example II 3,645 grams of hydrochloric acid (1/10 mol) in the form of a 30% solution were added to 19.4 grams (1/10 mol) of piperazine hexahydrate and when all is in solution, 13.75 grams (1/20 mol) of glycolylarsanilic acid is added. This mixture is heated at 80° under stirring for 15 minutes. From the mixture the water is distilled in vacuo below 70°. The residue is taken up in methanol, which dissolves part of it. The undissolved part is filtered and washed in methanol.

14.7 grams of a salt are obtained, which on analysis proves to be piperazine glycolylarsanilate hydrochloride, having the characteristics of having no definite melting point but decomposing between 200–300° C. The product is insoluble in methanol and water. The formula of the product is as follows:

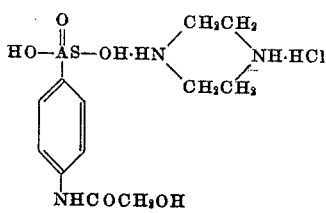

We claim:
1. As new products piperazine salts selected from the group consisting of piperazine di-glycolylarsanilate and piperazine glycolylarsanilate hydrochloride.
2. The piperazine diglycolylarsanilate salt having the formula:

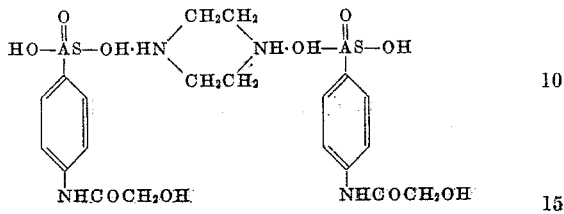

3. The piperazine glycolylarsanilate hydrochloride salt having the formula:

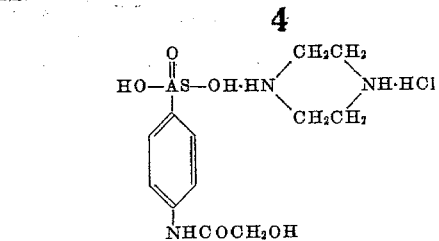

References Cited in the file of this patent

FOREIGN PATENTS 252,099   Great Britain _____ May 20, 1926

OTHER REFERENCES

Pathak: "Jour. Ind. Chem. Soc.," vol. 28, No. 4 (1951) pp. 198–200.